UNITED STATES PATENT OFFICE.

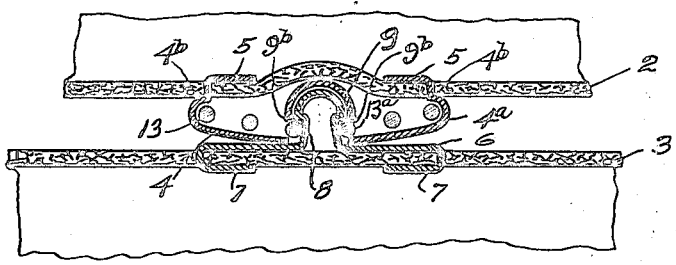
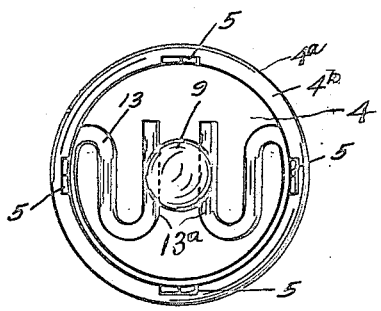
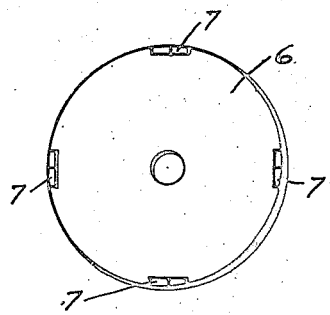
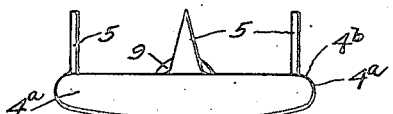
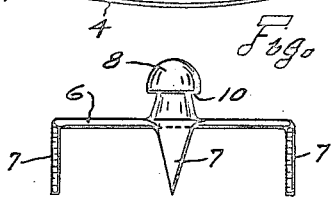
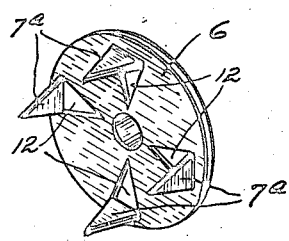

HENRY G. GOLDSTEIN, OF CLEVELAND, OHIO.

FASTENING DEVICE.

1,425,006.  Specification of Letters Patent.  Patented Aug. 8, 1922.

Application filed July 11, 1921. Serial No. 483,772.

*To all whom it may concern:*

Be it known that I, HENRY G. GOLDSTEIN, a citizen of the United States, residing at Cleveland, in the county of Cuyahoga and State of Ohio, have invented certain new and useful Improvements in Fastening Devices, of which the following is a specification.

My invention relates to improvements in fastening devices, and more particularly to improved means for connecting such fastening devices to the cloth or material without the use of threads by sewing as is the common practice in attaching such fasteners.

My invention relates more particularly to that class or type of fastening devices commonly known as "snap fasteners" whereby the head and socket members of such fasteners may be readily attached to and clamped upon the adjacent cloth or material whereby such fastener members are more securely secured and may be more expeditiously applied than through the ordinary sewing operation by fastening or connecting such fasteners to the material parts to be connected.

The primary object of the invention is to provide generally improved means for attaching and securing fastening devices to the material such as cloth or the like, such fastening means being exceedingly simple in construction, cheap of manufacture, and efficient in use.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is an enlarged central sectional view of a pair of snap fasteners embodying my improvements and attached to the adjacent members of the material or cloth to be connected.

Fig. 2, a view of the rear or under side of the socket member before being applied to the cloth.

Fig. 3, an edge view of the same.

Fig. 4, an edge view of the head member.

Fig. 5, a view of the rear or under side of the head member before being applied and secured in position.

Fig. 6, a perspective view of a head member provided with a modified form of attaching prongs.

Similar numerals of reference designate like parts throughout all the figures of the drawings.

In the present instance I have shown my improvements applied to or incorporated in a fastening device of the usual "snap fastener" type.

As a means of applying the socket and head members 4 and 6, to the separate parts or members 2 and 3, of the cloth or material to be connected as shown in Fig. 1, of the drawings, I provide the under sides of the socket and head members 4 and 6, with attaching prongs 5 and 7, respectively, said prongs being preferably of substantially angular shape as shown and being pointed so that the same may be readily driven into the material to penetrate the latter.

The separate attaching prongs or tines are preferably formed near the outer periphery of the socket and head members and normally extend in a plane substantially at right angles to the planes of the members 4 and 6, as shown most clearly in Figs. 3, 4 and 5 of the drawings.

The socket member 4, is preferably provided with a beading $4^a$, on its outer under side the edges of said beading terminating in the tapered cloth penetrating and attaching prongs 5 the under side of the beading $4^a$, forming an annular shoulder or support to cooperate with the inwardly bent prongs 5, when the latter are upset and clamped downwardly as shown most clearly in Fig. 1, of the drawings.

The socket member 4, is provided with a central head receiving opening $9^a$, formed by means of the socket 9, and the latter is preferably provided with slots $9^b$ in which the arm $13^a$, of the spring member 13, are adapted to operate in engaging the shoulder 10 of the head 8, of the head member 6.

It will be seen that the beading $4^a$, forms a shoulder $4^b$, and that the socket head 9, forms a central support relative to the inwardly extending attaching prongs 5, as shown most clearly in Fig. 1, of the drawings.

Referring to the modification shown in Fig. 6, of the drawings, it will be seen that as distinguished from the form of prongs hereinbefore described, the attaching prongs $7^a$, are struck out of the metal leaving inwardly extending tapered openings 12, said prongs 7ª being adapted to initially penetrate the material or goods and to be thereafter bent in either direction in the act of attachment.

Having thus described some of the embodiments of my invention, without having attempted to set forth all the forms in which it may be made, or all the modes of its use, what I claim and desire to secure by Letters Patent, is,—

1. In a fastening device, a disc shaped body terminating in a peripheral beading having an edge at the rear of said body terminating in material penetrating fastening prongs, the base of said beading forming a supporting shoulder on the face side of the material and extending approximately parallel therewith and said prongs being bent inwardly beneath the material in cooperative relation to said supporting shoulder.

2. In a fastening device, a disc-shaped fastener body terminating at its edges in an inwardly curled annular beading on its under side, said beading terminating at its edge in inwardly extending attaching prongs, the base of said beading forming a shoulder extending substantially parallel with the face of the fastener body to rest on the face side of the subjacent material and said attaching prongs being bent inwardly beneath said material in cooperative relation to said shoulder when attached.

In testimony whereof I have affixed my signature.

HENRY G. GOLDSTEIN.